J. DAIN.
SIDE DELIVERY RAKE.
APPLICATION FILED MAY 15, 1916.
1,241,096.
Patented Sept. 25, 1917.
2 SHEETS—SHEET 1.
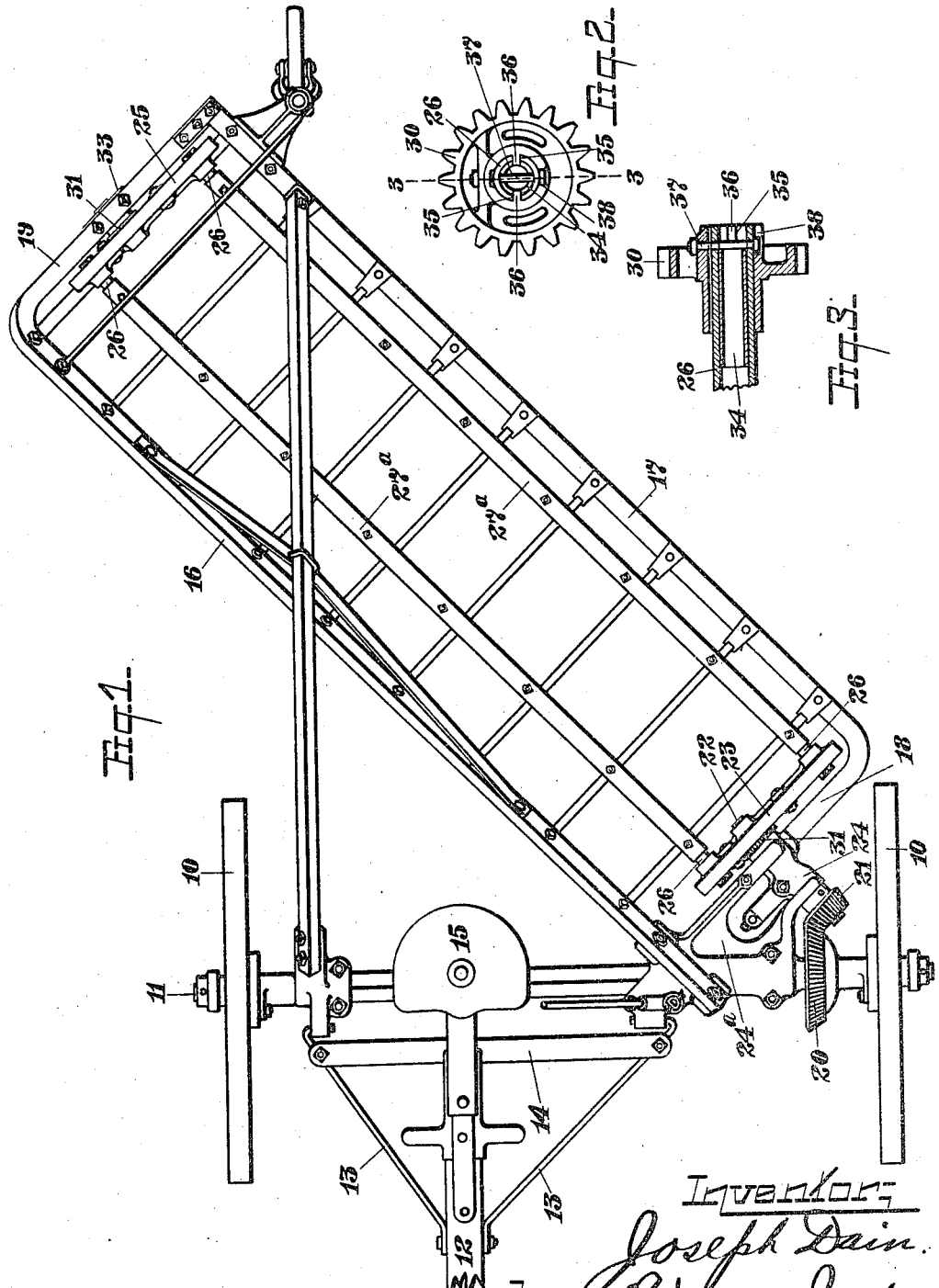

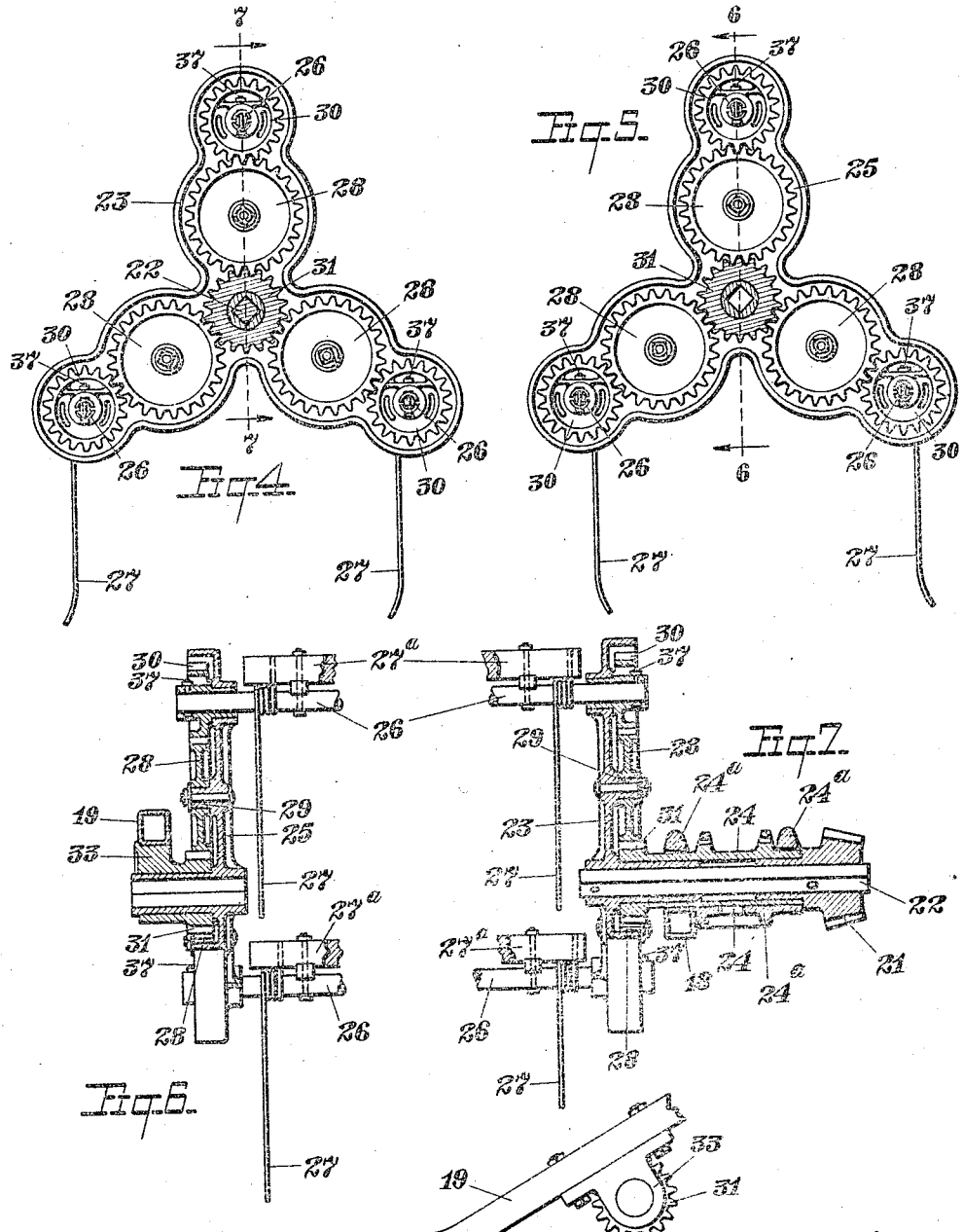

UNITED STATES PATENT OFFICE.

JOSEPH DAIN, OF MOLINE, ILLINOIS, ASSIGNOR TO DAIN MANUFACTURING COMPANY, OF OTTUMWA, IOWA, A CORPORATION OF IOWA.

SIDE-DELIVERY RAKE.

1,241,096.    Specification of Letters Patent.    Patented Sept. 25, 1917.

Application filed May 15, 1916. Serial No. 97,657.

*To all whom it may concern:*

Be it known that I, JOSEPH DAIN, a citizen of the United States, and a resident of Moline, in the county of Rock Island and State of Illinois, have invented certain new and useful Improvements in Side-Delivery Rakes, of which the following is a specification, reference being had to the accompanying drawings.

This invention relates to side-delivery rakes of that type comprising a rotary reel arranged at an angle to the line of draft and carrying several series of rake-teeth that are held at all times in a substantially vertical position through the operation of suitable gearing connected with the reel, to certain members of which gearing the bars that carry the rake-teeth are secured. In rakes of this general type it has been the common practice to mount the teeth-carrying reel upon a shaft extending centrally through the reel from end to end thereof, both of the heads of the reel being connected therewith. One objection, which has long been recognized in connection with such constructions, is that the presence of this longitudinally-extending central shaft necessarily restricts the length of the rake-teeth, for, of course, it will be understood that such teeth must be less than one-half of the diameter of the reel in order that they may clear such shaft as they pass over it during the rotation of the reel. Teeth of this restricted length do not always have the resiliency requisite for the accomplishment of the best results, as on account of their undue stiffness they will frequently strike the hay such severe blows that the leaves and blades of the hay—the most nutritious parts—are broken off and lost or destroyed. Furthermore, such unduly shortened rake-teeth will frequently subject the reel and driving mechanism as a whole to sudden shocks owing to their striking obstructions or uneven places on the ground and being unable to yield or spring sufficiently. By the use of such comparatively short teeth the reel as a whole must necessarily travel closer to the ground than is at all times desirable, with the result that at times the teeth-carrying bars will strike stumps, stones and other obstructions with disastrous results to the machine.

It is the object of my present invention to overcome these objections incident to the employment of such central reel shaft and at the same time preserve all the desirable features pertaining to the type of rake referred to and obtain the added advantage of being able to employ longer teeth that are necessarily more resilient. Briefly stated, I accomplish this object by equipping both heads of the reel with identical sets of gearing and providing certain novel strengthening and gear-connecting means at the ends of the teeth-carrying bars (all as hereinafter particularly described) whereby the said bars are so stiffened and so secured to the gearing that the driving power imparted to the gearing connected with the forward head of the reel is transmitted wholly through the teeth-carrying bars to the similar gearing connected with the rearmost head of the reel, thus enabling the reel to be driven equally at both ends and dispensing entirely with the said central shaft. That which I believe to be new will be pointed out in the claims.

In the drawings,—

Figure 1 is a plan view of a side-delivery rotary rake provided with my improvements;

Fig. 2 is a detail being an end view of one of the tubular teeth-carrying bars and the gear-member connected thereto at that end, and showing the means employed for strengthening the bar and also the means for securing it to said gear member;

Fig. 3 is a central cross-section at line 3—3 of Fig. 2;

Figs. 4 and 5 are enlarged end views of the front and rear heads, respectively, of the reel, the central member of each train of gears carried by the heads being in section;

Figs. 6 and 7 are vertical sections on the lines 6—6 and 7—7, respectively, of Figs. 5 and 4, the portions of the teeth-carrying bars shown being in elevation; and Fig. 8 is a detail, being an elevation of a portion of the rear end bar of the reel-supporting frame and the central member of the train of gearing at that end of the reel.

Referring to the several figures of the drawings, in which corresponding parts are indicated by like reference characters,—

10 indicates a pair of carrying wheels which are mounted upon an axle 11, the wheels and axle being so connected together by any suitable means as to cause the axle to rotate upon the forward movement of the machine. 12 indicates a tongue laterally supported by braces 13. 14 indicates a cross-bar secured in front of the axle and extending across the base of the tongue 12. 15 indicates a driver's seat mounted in any suitable manner upon the tongue 12 and cross-bar 14. 16 and 17 indicate the front and rear members, respectively, and 18 and 19 the end members of the diagonally-arranged frame in which the reel is supported,—18 being applied to the member at the forward end and 19 to the member at the rear end. The reel-supporting frame is to be connected with the axle in any usual manner, the details of such connections not being here described as they form no part of my present invention. Upon the axle 11 adjacent to the forward end of the reel-supporting frame is secured, so as to turn with the axle, a beveled gear 20 adapted to mesh with a beveled pinion 21 that is suitably secured upon the forward end of a short shaft 22, which, as shown, is angular in cross-section, the other end portion of such short shaft projecting a short distance beyond the end member 18 of the reel-supporting frame and being there secured in any appropriate manner to the forward head 23 of the reel, so that such head will rotate with the shaft. The extended hub portions of the beveled pinion 21 and the head 23 are journaled in a non-revoluble sleeve 24 supported by a bracket 24ª, which bracket is connected as usual with the axle 11, the extended hub portions of the beveled pinion and head forming the bearing for the shaft 22.

The reel that has been referred to comprises the head 23 already mentioned, a similar head at the rear end of the supporting frame, which rear head is indicated by 25, and a plurality of hollow teeth-carrying bars 26 extending between and projecting through the heads—three of such bars being shown. The wire raking-teeth carried by these bars are indicated by 27, which teeth, as clearly shown in Fig. 6, are of such length that when in their uppermost position they will extend past the axis of the reel. Each bar 26 is shown as having connected to it the usual beam, indicated by 27ª, with which the upper ends of the wires forming the teeth engage. Each of the heads 23 and 25 is shown (see Figs. 4 and 5) as formed to present three arm-like portions, against the outer face of each of which are secured two gears, the inner gear 28 of each set being journaled on a stud 29 secured to the head and each outer gear 30 being secured upon one of the teeth-carrying bars in the novel manner about to be described. The inner gear of each of the three sets is in mesh with a central stationary gear 31, the forward gear 31 being formed integral with the sleeve 24 and the rear gear 31 being formed integral with a bracket 33 bolted to the end of the frame member 19, said bracket 33 as shown in Fig. 6 serving as a bearing for the extended hub portion of the rear head 25.

In my former Patents, No. 886,681, dated May 5, 1908, and No. 1,007,676, dated November 7, 1911, a train of gearing, such as shown herein, is described in connection with the forward one of the heads of a reel in a rake of this general type, and the effect thereof in keeping the rake-teeth in a substantially vertical position at all times is fully set forth, and it is therefore not deemed necessary to here again describe such operation.

With the central shaft omitted that extended from end to end of the reel in the constructions shown in my said former patents, the tendency—always present in rakes of this general type—of the reel to twist, or, in other words, have the outer ends of the teeth-carrying bars fall behind the forward ends, is intensified, and to overcome that tendency to at least as great an extent as the presence of the central reel-shaft would overcome it, I have not only provided for equipping both of the reel-heads with trains of gearing, but I have provided means for so strengthening or stiffening the teeth-carrying bars and so securing them rigidly to the gearing that they will sufficiently withstand the torque or twisting strain to which they are subjected when in use, and will properly transmit the power received from the forward reel-head and train of gears to the outer or rearmost reel-head and train of gears. I accomplish this by providing at each end of each of said bars the means shown in detail in Figs. 2 and 3. As there shown, there is inserted within the hollow teeth-holding bar a closely-fitting section of tubing 34, the outer end of which is not flush with the end of the bar but is some little distance back therefrom, for a purpose explained hereinafter. Such inserted piece of tubing very greatly reinforces or stiffens the bar. In that portion of the bar extending beyond the end of the tubular reinforcing piece 34, I provide two oppositely-located slots 35 and on the interior of the hub of the gear 30 are formed two oppositely-located lugs 36 adapted to project into said slots. 37 indicates a clamping bolt passed through the hub of the gear 30 at right angles to the direction of the inwardly-projecting lugs 36, the said hub having a recess or slot formed in it, as at 38, to receive the head of the bolt so that such head may bear against the bar 34; when the bolt is tightened it will draw the edges of the slots 35 very tightly toward each other and against the lugs 36 so that there is formed a very good driving connection between the bar 34 and the gear 30. Such tightening of the bolt 37 not only will cause a strong interlocking of the gear member 30 with the bar but will increase the frictional contact between the bar and the inserted reinforcing section 34 so as to prevent any possibility of independent movement of the latter. By locating the tubular reinforcing section back from the end of the bar as shown, such section need not be slotted to receive the inwardly-projecting lugs 36 or be drilled to permit the passage of the clamping bolt 37. By reason of the bolt being thus utilized as a tensioning device there is not that tendency to shear it off that would be present if it were employed as an ordinary linch-pin.

By my improved construction I provide a machine fully as strong and durable as those machines of the same general type that employ a reel having a central shaft from end to end thereof, and having the very decided advantages over such other machines of being able to employ very materially longer, and consequently more resilient, rake-teeth, and having the teeth-carrying bars at a greater height above the ground, whereby the possibilities of damage thereto by reason of striking stumps and other large obstructions are greatly diminished. Furthermore, by strengthening the ends of the several teeth-carrying bars and connecting them as described to the several gear-members 30 of both heads 23 and 25, a strong and unyielding structure is provided that permits of the application of the driving power equally at both ends of the reel.

What I claim as my invention and desire to secure by Letters Patent, is—

1. In a side-delivery rake, the combination with a wheeled frame, of a diagonally-arranged reel-supporting frame in rear of and attached to said wheeled frame, a reel supported in said reel-frame and comprising two heads rotatably connected with opposite ends of said reel-frame and teeth-carrying bars constituting the only direct operative connection between the heads, means for applying power to one head to rotate the reel, and means carried by each head and connected with said bars for transmitting the driving power through said bars from one head to the other head and also holding the various teeth in substantially vertical position.

2. In a side-delivery rake, the combination with a wheeled frame, of a diagonally-arranged reel-supporting frame in rear of and attached to said wheeled frame, a reel supported in said reel-frame and comprising two heads rotatably connected with opposite ends of said reel-frame and teeth-carrying bars constituting the only direct operative connection between the heads, means for applying power to one head to rotate the reel, and a train of gearing carried by each head, said bars being rigidly secured to corresponding members of each train whereby the driving power is transmitted from one head to the other and the various teeth are maintained in substantially vertical position.

3. In a side-delivery rake, the combination with a wheeled frame, of a diagonally-arranged reel-supporting frame in rear of and attached to said wheeled frame, a reel supported in said reel-frame and comprising two heads rotatably connected with opposite ends of said reel-frame and teeth-carrying bars constituting the only direct operative connection between the heads, teeth on said bars of a length to extend downward past the axis of rotation of the reel when in their uppermost position, means for applying power to one head to rotate the reel, and a train of gearing carried by each head, said bars being rigidly secured to corresponding members of each train whereby the driving power is transmitted from one head to the other and the various teeth are maintained in substantially vertical position.

JOSEPH DAIN.

Copies of this patent may be obtained for five cents each, by addressing the "Commissioner of Patents, Washington, D. C."